United States Patent
Jha et al.

(10) Patent No.: US 12,412,027 B1
(45) Date of Patent: Sep. 9, 2025

(54) MACHINE LEARNING MODEL AUTOMATED DATA EXTRACTION AND PREDICTION

(71) Applicant: INTUIT INC., Mountain View, CA (US)

(72) Inventors: Chandrashekhar Jha, Bengaluru (IN); Bharath G R, Bengaluru (IN); Pallenavya Manishankar, Bengaluru (IN); Sourodeep Chatterjee, Bengaluru (IN); Abhinesh, Bengaluru (IN); Vishal Babani, Bengaluru (IN); Prateek Mukhija, Bengaluru (IN); Harshitha Srikanth, Bengaluru (IN); Shivam Sharma, Bengaluru (IN); Pushpavathi K N, Bengaluru (IN)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 19/194,795

(22) Filed: Apr. 30, 2025

(51) Int. Cl.
| | |
|---|---|
| G06F 16/00 | (2019.01) |
| G06F 16/35 | (2019.01) |
| G06F 21/62 | (2013.01) |
| G06F 40/166 | (2020.01) |
| G06F 40/205 | (2020.01) |
| G06F 40/279 | (2020.01) |
| G06V 30/41 | (2022.01) |

(52) U.S. Cl.
CPC ............ *G06F 40/166* (2020.01); *G06F 16/35* (2019.01); *G06F 21/6254* (2013.01); *G06F 40/205* (2020.01); *G06F 40/279* (2020.01); *G06V 30/41* (2022.01)

(58) Field of Classification Search
CPC .... G06F 40/166; G06F 16/35; G06F 21/6254; G06F 40/205; G06F 40/279; G06F 21/604; G06F 21/6245; G06F 9/451; G06F 21/6218; G06V 30/41; G06N 20/00; H04L 63/04; H04L 63/20; H04L 63/0407; H04L 9/3213; H04L 9/50; H04L 9/3239; G06Q 30/02; G06Q 40/08
See application file for complete search history.

(56) References Cited

U.S. PATENT DOCUMENTS

| | | | |
|---|---|---|---|
| 2022/0129583 A1* | 4/2022 | Balasubramanian | .. G06N 20/00 |
| 2024/0265465 A1* | 8/2024 | Thompson | ............ H04L 9/3213 |
| 2024/0273227 A1* | 8/2024 | Thompson | .......... G06F 21/6218 |

* cited by examiner

*Primary Examiner* — Yicun Wu
(74) *Attorney, Agent, or Firm* — Patterson + Sheridan, LLP

(57) ABSTRACT

Aspects of the present disclosure relate to automated data extraction and prediction using machine learning models. Embodiments include extracting, by a text extraction engine, a set of data from each document of one or more documents provided to the text extraction engine. Embodiments include instructing a machine learning model, via a prompt, to identify and classify one or more protected entities contained in the set of data from each document by parsing the set of data from each document. Embodiments include instructing the machine learning model, via the prompt, to generate, for each protected entity of the one or more protected entities identified in the set of data from each document, a corresponding unprotected entity and to replace each protected entity with the corresponding unprotected entity. Embodiments include receiving an output from the machine learning model in response to the prompt and performing an action based on the output.

20 Claims, 5 Drawing Sheets

MACHINE LEARNING MODEL AUTOMATED DATA EXTRACTION AND PREDICTION

INTRODUCTION

Aspects of the present disclosure relate to techniques for automated data extraction and prediction using machine learning models. In particular, techniques described herein involve instructing a machine learning model, via a prompt, to identify and classify protected entities from a set of data extracted from one or more documents, replace each protected entity with an unprotected entity generated based on attributes associated with the protected entities, and provide an output in response to the prompt.

BACKGROUND

Every year, millions of people, businesses, and organizations around the world use software applications to assist with countless aspects of life. Often times, these software applications have access to personal information of the individuals using the software applications (e.g., for processing, transferring, storing, and/or the like). Unsecured personal information poses a significant risk. Therefore, security measures, such as removing identifiable information from user records, may be utilized to safeguard this personal information when provided to a particular software application. Existing techniques for implementing such measures, however, require extensive manual processing, which is time consuming, resource-intensive, and prone to errors. This drives up costs as well as decreases downstream efficiency (e.g., when further processing of the user records by one or more features of a software application is delayed and/or an error is caused). Additionally, existing techniques are limited to specific applications, which further hinders protection efforts (in addition to downstream processing) and/or increases the costs associated with implementing the security measures (i.e., due to allocating more time and resources to ensure sensitive data is not exposed).

Thus, there is a need in the art for improved techniques for protecting personal information in software applications.

BRIEF SUMMARY

Certain embodiments provide a method of automated data extraction and prediction using machine learning models. The method generally includes: providing one or more documents to a text extraction engine; extracting, by the text extraction engine, a set of data from each document of the one or more documents; instructing a machine learning model, via a prompt, to parse the set of data from each document of the one or more documents and identify one or more protected entities contained in the set of data from each document of the one or more documents; instructing the machine learning model, via the prompt, to classify each protected entity of the one or more protected entities identified by the machine learning model in the set of data from each document of the one or more documents; instructing the machine learning model, via the prompt, to generate, for each protected entity of the one or more protected entities identified in the set of data from each document of the one or more documents, a corresponding unprotected entity; instructing the machine learning model, via the prompt, to replace each protected entity of the one or more protected entities identified in the set of data from each document of the one or more documents with the corresponding unprotected entity; receiving an output from the machine learning model in response to the prompt; and performing an action based on the output.

Other embodiments provide processing systems configured to perform the aforementioned method as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
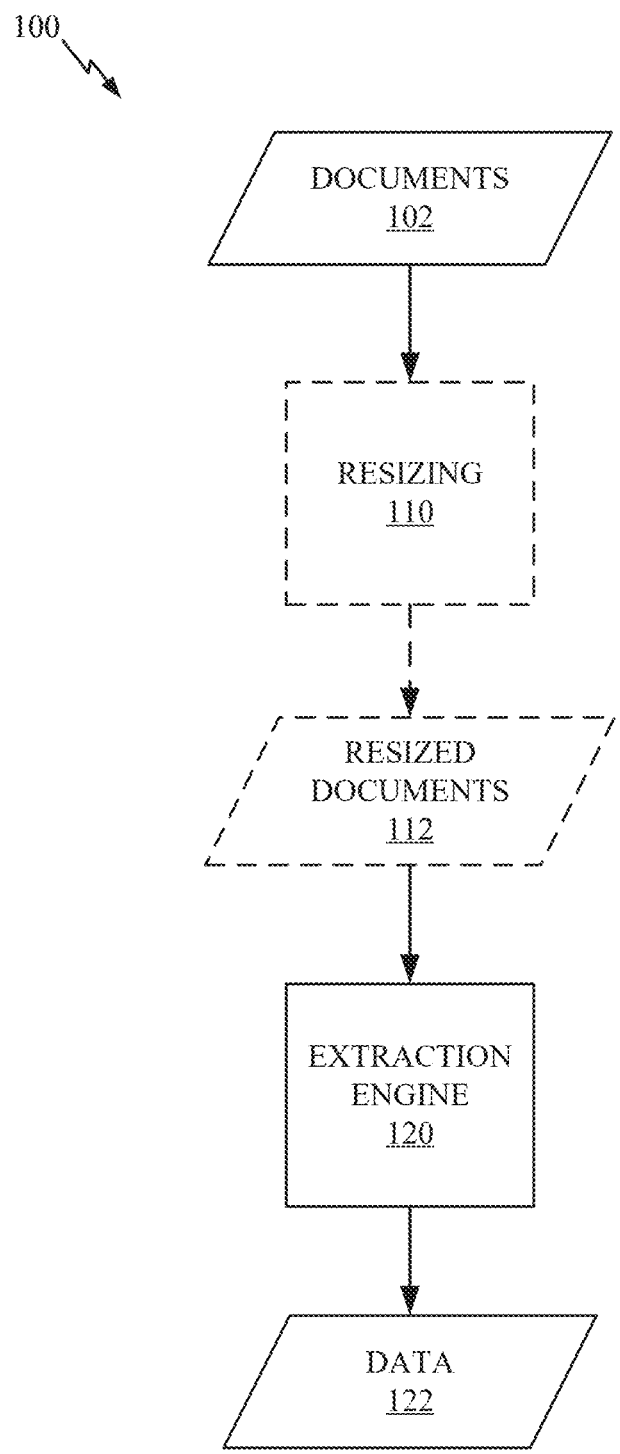
FIG. 1 depicts an example of workflow related to automated data extraction and prediction using machine learning models.

Aspects of the present disclosure provide apparatuses, methods, processing systems, and computer-readable mediums for automated data extraction and prediction using machine learning models.

Protecting personally identifiable information (PII), such as names, addresses, social security numbers, and/or the like, is crucial to minimizing risk (e.g., safety, financial, etc.) to individuals using a particular software application. Securing PII, for instance, may include concealing, removing, and/or replacing PII in documents provided to the software application. Current techniques for securing PII in software applications, however, require manual processing, which is costly and error prone, and are also limited in application, leading to lengthened processing times, increased costs, and unprotected PII. To improve PII protection in software applications, techniques described herein employ machine learning models to automatically identify and classify PII by parsing data extracted from one or more documents (e.g., provided to a software application) according to particular techniques and automatically replacing the PII with unprotected information that is dynamically generated based on attributes associated with the PII. Such techniques result in an automated process that is more efficient, more accurate, and more thorough than alternative techniques, which increases PII protection, enhances data privacy, and improves downstream processing.

For example, one or more documents may be provided to a text extraction engine, such as an optical character recognition (OCR) system. The documents may include a number of file formats, such as a portable document format (PDF) file, a joint photographic experts group (JPEG) file, a portable network graphics (PNG) file, and/or the like. The text extraction engine may extract a set of data from each document. The set of data for each document may include text from the document, formatting associated with the text (e.g., font type, size, color, etc.), and/or a geometry associated with the text (e.g., where in the document the particular text was located). In some cases, if a particular document exceeds a predefined length, such as one page, the document may be divided into smaller, single page documents for processing by the text extraction engine. Such division ensures that lengthy, multi-page documents are processed more efficiently and accurately.

Once the data has been extracted, a machine learning model, such as a language processing machine learning model, may be instructed, via a prompt, to parse the set of data for each document and identify any protected entities contained in the data. The language processing machine learning model may, for instance, be a large language model capable of processing natural language inputs and generating natural language outputs. A protected entity may include an individual's name, address, social security number, and/or other types of PII, among others. Additionally, any entity that is not identified as a protected entity may be removed from its corresponding data set. For example, text with a monetary amount (e.g., from a transaction) for use in downstream analysis is not protected PII and may be removed from the data set. In this way, the system may focus on classifying and replacing only the protected information, saving time and computing resources.

The machine leaning model may then be instructed via the prompt to classify each protected entity identified in the data. For example, classifying the protected entities may include assigning each protected entity to a category, such as "first name," "last name," "street address," "city," "state," etc. Next, the machine learning model may be instructed via the prompt to generate, for each identified protected entity, a corresponding unprotected entity. Generating the unprotected entity may be based on the classifications and/or may include assigning one or more attributes associated with the protected entity to the unprotected entity. For example, if a certain protected entity is a name, the corresponding unprotected entity will also be a name. Additionally, the unprotected entity may share other features with the protected entity, such as a font type, size, and/or color as well as document coordinates (e.g., where in the document the protected entity is located). The machine learning model may then be instructed via the prompt to replace each identified protected entity with its corresponding unprotected entity. As noted above, the unprotected entity may be the same category, font type, font size, font color, and/or share document coordinates with the protected entity so that it may seamlessly replace the protected entity (i.e., the protected part, such as the name, is changed but the remaining features stay the same).

Lastly, an output may be received from the machine learning model in response to the prompt and an action may be performed based on the output. For example, performing the action may include providing the identified protected entities, along with their classifications, in a structured object format (e.g., for analysis and/or training purposes) and/or saving each document with the replaced entities. Actions may further include displaying the saved documents via a user interface and/or sending the saved documents to one or more elements of a software application (e.g., for processing).

Embodiments of the present disclosure provide numerous technical and practical effects and benefits. As noted above, protecting PII is imperative to maintaining data privacy in software applications. Existing techniques for protecting PII, however, require extensive manual processing, including in identifying and replacing PII contained in user documents, which is time-consuming, resource-intensive, and prone to error. Existing techniques are also limited in application, such as in the types and/or sizes of documents that may be processed, which further increases the time and resources expended. The present disclosure solves these technical problems. Techniques described herein ensure accurate and efficient automated PII protection through particular types of instructions provided to a machine learning model for automatically extracting text from documents, automatically identifying protected entities in the text, and automatically replacing those protected entities with unprotected entities that correspond to the protected entities (e.g., in type and/or other characteristics). The automated process allows for more document types (such as image files) to be processed while simultaneously decreasing errors and processing time, saving resources and improving downstream efficiency. Additionally, dividing lengthy documents into smaller, less complex chunks further improves the brevity and accuracy with which the system processes the documents, while removing extraneous entities that are not protected from the data set further increases processing efficiency. Overall, these techniques not only save resources, but ensure more robust protection for sensitive information and improve downstream efficiency (which also saves resources and provides a better experience for the user).

Example Workflows Related to Automated Data Extraction and Prediction Using Machine Learning Models FIG. 1 depicts an example workflow 100 related to automated data extraction and prediction using machine learning models. For example, workflow 100 may represent a series of steps associated with pre-processing and extracting data from one or more inputs.

One or more documents 102 may be provided to a software application, such as for processing, analysis, and/or the like by one or more features of the software application. The documents 102 may include personal information, such as PII, that is deemed protected, along with various other forms of unprotected information. PII may include, but is not limited to, names, addresses, social security numbers, and date of birth information. PII may be classified into three categories. Type 1 PII may refer to personal information that, on its own, reveals an individual's identity (e.g., a social security number). Type 2 PII may refer to personal information that reveals an individual's identity when combined with other related PII (e.g., a full name plus a home address). Type 3 PII may refer to information, typically numerical values, that require a number of other levels to identify an individual (e.g., a salary which requires combination with company information, job position information, and more). The documents 102 may comprise a variety of file types, such as documents file types (e.g., PDF, DOC, DOCX, etc.) and/or image file types (e.g., JPEG, PNG, BMP, etc.), among others.

The documents 102 may be passed to an extraction engine 120. The extraction engine 120 may comprise an OCR system that extracts text and other data from provided documents. For example, the extraction engine 120 may extract one or more lines of text from each document of documents 102 along with data associated with each line, such as its bounding box (e.g., the geometrical representation of the area where the actual data lies in a document). The extraction engine 120 may then output the extracted text and data, depicted as data 122. The data 122 may be passed to a machine learning model for further processing as depicted with respect to FIG. 2. A sample of data 122 is provided below:

```
{
    "BlockType": "LINE",
    "Confidence": 99.69104766845703,
    "Text": "John A",
    "Geometry": {
        "BoundingBox": {
            "Width": 0.1294654756784439,
            "Height": 0.006249138154089451,
            "Left": 0.30638250708580017,
            "Top": 0.1075674444437027
        },
        "Polygon": [
            {
                "X": 0.30638250708580017,
                "Y": 0.10772330313920975
            },
            {
                "X": 0.4358479976654053,
                "Y": 0.1075674444437027
            },
            {
                "X": 0.43584322929382324,
                "Y": 0.11365564167499542
            },
            {
                "X": 0.30638718605041504,
                "Y": 0.11381658166646957
            }
        ]
    },
    "Id": "be330cb4-0463-4c4f-82b4-55922a85f9e5",
    "Relationships": [
        {
            "Type": "CHILD",
            "Ids": [
                "5b177c5f-73a6-4569-bca2-ef6f6e98688e",
                "863714b5-659a-47d9-ac42-1a52c5cb4155",
                "93127d22-27de-48c0-a862-712a84157255",
                "1141ea14-4b57-42ba-8c6b-d9fe1b69390c",
                "7bd2aa29-52bb-4e7c-aa7c-72a16786982a"
            ]
        }
    ],
    "Page": 1
}
```

If a document of documents 102 exceeds a certain length, it may receive pre-processing before it is passed to the text extraction engine 120. For example, if a document is longer than a single page, it may be divided into multiple, one-page documents during resizing 110. The resized documents 112, along with any single page documents of documents 102 that did not require division during resizing 110, may then be passed to the extraction engine 120 for processing as described above. As a result of resizing 110, the single page documents may be processed more quickly and accurately by the extraction engine 120 and/or by one or more of the procedures described below with respect to FIG. 2.

Figure 2:
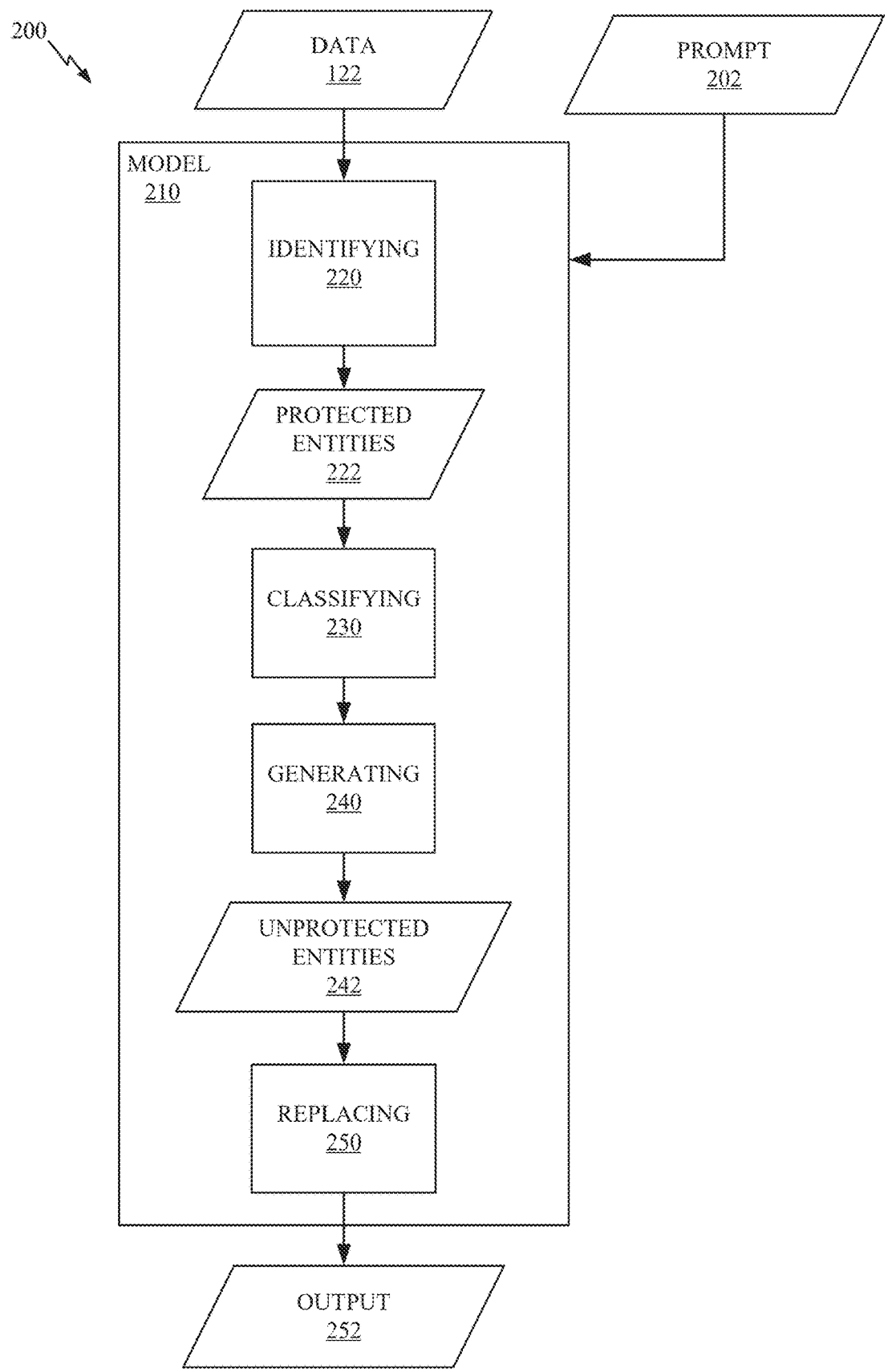
FIG. 2 depicts an additional example of workflow related to automated data extraction and prediction using machine learning models.

FIG. 2 depicts an additional example workflow 200 related to automated data extraction and prediction using machine learning models. In particular, FIG. 2 depicts a series of steps that may be performed subsequent to the processing of FIG. 1 in which protected entities in extracted data are identified, classified, and replaced with unprotected entities.

A model 210 may comprise a machine learning model. In a particular example, model 210 is a language processing machine learning model such as a large language model (LLM). For example, model 210 may have been trained on a large training data set in order to process natural language inputs and generate natural language content in response. In some embodiments, model 210 is a generative pre-trained transformer (GPT) model that has been trained on a large set of training data (e.g., across a plurality of domains), and is capable as a result of such training to perform a wide variety of language-related tasks in response to natural language prompts. In some embodiments, model 210 has been fine-tuned for one or more particular domains, such as for use with a particular software application or for a specific purpose, while in other embodiments model 210 has been trained in a more general fashion and has not been fine-tuned in such a manner. Model 210 may have a large number of tunable parameters, which are iteratively adjusted during a model training process based on training data. In alternative embodiments, model 210 may be another type of machine learning model that is capable of generating content. For example, model 210 may be a generative adversarial network (GAN), an autoencoder model, an autoregressive model, a diffusion model, a Bayesian network, a hidden Markov model, and/or the like.

Data 122 may be provided to the model 210. As described with respect to FIG. 1, the data 122 may comprise one or more lines of text along with associated data extracted (e.g., by extraction engine 120) from one or more documents provided to a software application (e.g., via a user interface). The model 210 may also be provided with a prompt 202. The prompt 202 may contain natural language, code language, or a combination thereof. The prompt 202 may further include instructions for the model 210 to follow, a list of categories for the identification and classification processes, the nature of the output the model 210 is to provide, and/or the format in which to provide the output. A sample prompt is provided below:

You are a helpful assistant. You help to identify the PII data in the given collection of data blocks which is a line by line extracted content from a tax document through OCR. Each data block is separated by a delimiter \n. Consider them as separate.

For each of the data blocks, drop them if the data is not PII.

If the data block is PII, perform below specified tasks on each one of the data blocks and format the sample output as shown in the output section.

1. Pick the data from the data block and place it as original_data.
2. Classify the PII data to one of the types from [firstname, lastname, province, zipcode, state, city, email, country, company, date, ssn, credit_card_number] and place it as a category.

Consider following typescript interface for the JSON schema:

```
              interface PIIClassification
                  original_data: string;
                  category: string;
              }}
              interface Output
                  data: PIIClassification[ ];
              }}
```

Respond in valid JSON format. DO NOT MAKE UP DATA.
Here is an example of the input and output:

```
input: First Name\nJames A\nLast Name\nBednar\nForeign
Country Name\nUSA
output:
{{
   "data": [
      {{
         original_data: "Jame A",
         category: "firstname"
      }},
      {{
         original_data: "Bednar",
         category: "lastname"
      }},
      {{
         original_data: "USA",
         category: "country"
      }}
   ]
}}
Note that all the amounts are classified as PII.
```

During identifying 220, the model 210 may parse the data 122 and identify protected entities 222 in the data 122. The protected entities 222 may comprise personal information, such as type 1 and/or type 2 PII, among others. The specific classes of information that constitute a protected entity may be provided to the model 210 via the prompt 202. Additionally, the model 210 may remove from the data 122 any entities not identified as one of protected entities 222. For example, each line of data 122 may be analyzed. If a particular line contains PII, such as a name, it may be flagged as a protected entity. If the particular line does not contain PII, it may be removed from the set of data. In this way, only the pertinent entities undergo further processing, saving time and resources. The model 210 may then classify each protected entity of protected entities 222 according to one or more categories (e.g., provided via the prompt 202). For example, the categories may correspond to the type of information that was identified, such as first name, last name, street address, city, state, etc.

Next, the model 210 may generate, for each protected entity of protected entities 222, a corresponding unprotected entity, collectively unprotected entities 242. Generating 240 may comprise determining one or more attributes associated with each protected entity and assigning the one or more attributes to the corresponding unprotected entity. The attributes, for instance, may include a font type, a font size, background color, and/or a location within a document. For example, the generated unprotected entity may match the protected entity such that they both have the same font, color, size, location, etc.

The font size required to fit in the bounding box may be calculated by first computing the following variables from the bounding box and an image contained therein:

$y_1 = \text{int}(w \cdot pii\_detection\_box.top)$ $y_2 = \text{int}(w \cdot (pii\_detection\_box.height + pii\_detection\_box.top))$ $x_1 = \text{int}(h \cdot pii\_detection\_box.left)$ $x_2 = \text{int}(h \cdot (pii\_detection\_box.width + pii\_detection\_box.left))$ where h is the height of the image, w is the width of the image, and pii_detection_box.z corresponds to a coordinate of the bounding box with z denoting the particular coordinate {width, height, left, top}. Then, a binary search may be applied with a minValue=1 and a maxValue=$y_1$-$y_2$. A sample algorithm to compute the font size is provided below:

```
fn(bounding_box, font_type):
    max_width, max_height = bounding_box[width],
bounding_box[height]
    low,high=1, max_height
    best_fit_size = 1
    while low <= high:
        mid = (low + high) / 2
        font = ImageFont.truetype(font_type, mid) # mid
represents font_size
        bbox_text = draw.textbbox((0, 0), text, font=font)
        text_width = bbox_text[2] – bbox_text[0] # width =
right – left
        text_height = bbox_text[3] – bbox_text[1] # height
= bottom – top
        if text_width <= max_width and text_height <=
max_height:
            best_fit_size = mid
            low = mid+1
        else:
            high = mid–1
    return best_fit_size
``` where bounding_box={width, height, left, top}, max_width=bounding_box [width], and max_height=bounding_box [height].

The background color of the bounding box may then be calculated using the following function:

```
fn(bounding_box):
    descending_sorted_colour_freq_map =
getDescendingSortedColourFrequencyMap( )
    bg_colour = descending_sorted_colour_freq_map[0] #Most
Frequent colour
```

If the protected entity is text (e.g., a name), new text of the same category is generated and the font size and/or background color determined above is applied to the new text. If the protected entity is a value (e.g., a social security number), normally distributed random noise may be generated (e.g., with a mean μ=0 and a standard deviation σ=0.1) and added to the value to create a new value.

Once the unprotected entities are generated, each protected entity may be replaced by its corresponding unprotected entity during replacing 250. The replacing 250 may comprise clearing the original entity from the bounding box and filling it in with the generated entity. For example, a document, such as a tax form, may contain an individual's name. After the name is extracted and identified as a protected entity, that name may be replaced by an arbitrary name that is not associated with the individual (e.g., "John Smith" is replaced with "Richard Doe"). The new name may share all other characteristics, such as font type and size, the location within the document that the name was listed, etc., with the original name such that the document may be passed along for further analysis (e.g., calculating a tax refund by one or more other software components). All fields of the document remain completed, but the personal information is altered to maintain anonymity. This automated process, utilizing a text extraction engine in conjunction with a machine learning model that is guided through a particular series of instructions included in a prompt, for identifying and replacing PII enables large-scale processing of documents of various types with high accuracy (99%-100% according to experimental results) while also decreasing the time expended by 30% compared to manual methods, as demonstrated by experimental results.

Lastly, the model 210 may provide an output 252 and an action may be performed based on the output. For example, a new document containing the replaced entities may be saved, sent to one or more elements of a software application, and/or displayed via a user interface as described below with respect to FIG. 3. Additionally, if a document was resized according to one or more steps depicted with respect to FIG. 1, the subsets of single pages may be re-combined into one multi-page document corresponding to the original document length. In another example, the identified protected entities, along with their respective classifications may be provided in a structured file format. A structured file format, such as JavaScript Object Notation (JSON), is a standardized, text-based format used for storing and transmitting data. The file may then be stored, analyzed for correctness, used to train a model (such as model 210), and/or the like. A sample portion of the file is provided below:

```
"piiType": "firstname",
"rawValue": "James A",
"deIdentifiedValue": "Mason",
"geometry": {
   "boundingBox": {
      "width": 0.05126955,
      "height": 0.028863067,
      "left": 0.013081731,
      "top": 0.5025235
   }
},
"maskedValue": "XXXXXX",
"editDistance": 5,
"page": 1
```

Figure 3:
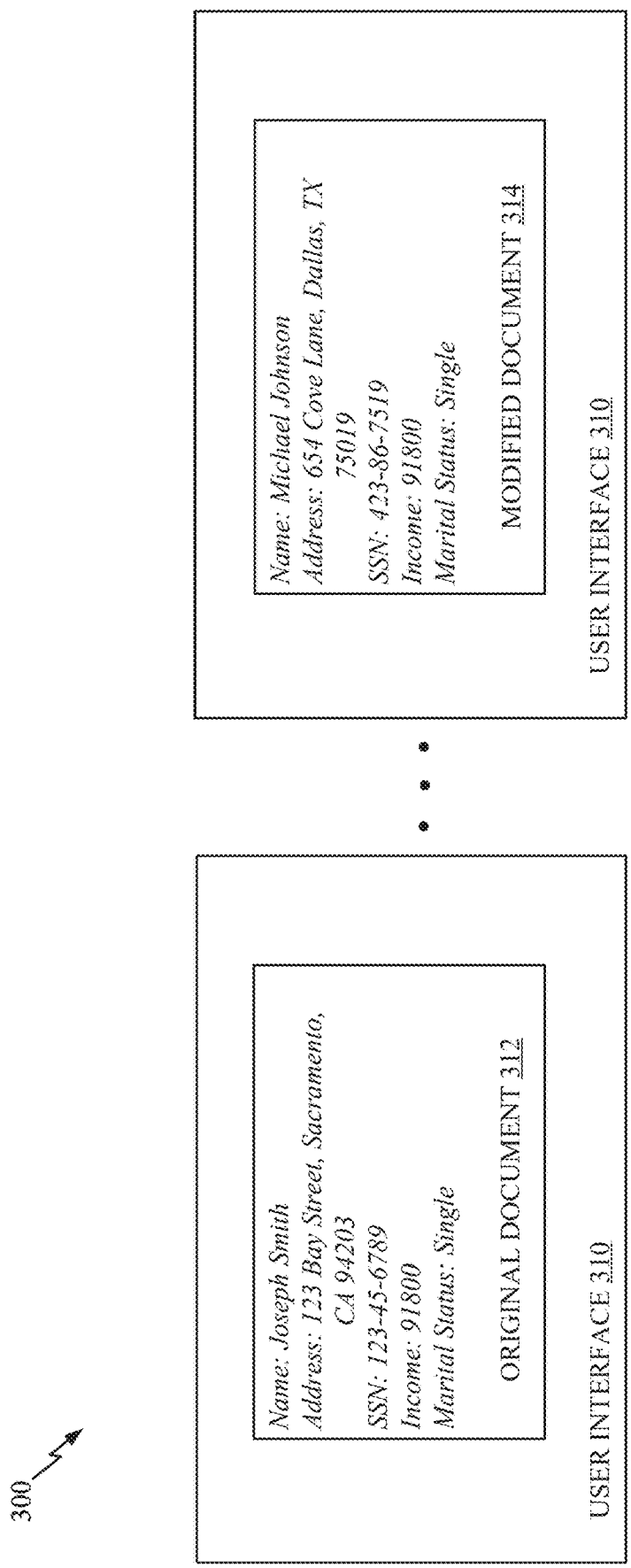
FIG. 3 is a block diagram illustrating an example related to automated data extraction and prediction using machine learning models.

Example Block Diagram Related to Automated Data Extraction and Prediction Using Machine Learning Models FIG. 3 depicts a block diagram 300 illustrating an example related to automated data extraction and prediction using machine learning models. For example, block diagram 300 may represent an original document and a modified document generated by one or more steps described with respect to FIG. 1 and/or FIG. 2 and displayed on a user interface 310 (e.g., associated with a computing application running on a computing device).

A document may be provided to a software application via a user interface 310. For example, this document may be provided for analysis by a financial services tool within a particular software application and may include personal information, such as names, addresses, social security numbers, and/or the like. The document, such as a tax form, may include other information such as financial and/or tax-related fields as depicted in original document 312. As described with respect to FIG. 1 and FIG. 2, the original document 312 may undergo processing where any protected entities in the original document 312 are identified, classified, and replaced with corresponding unprotected entities.

The system may then provide a modified document 314 (e.g., containing the replaced entities), such as via the user interface 310. The modified document 314 may then be passed along (e.g., to one or more features of the software application) for further processing, such as calculating a tax refund, without disclosing sensitive PII.

Notably, the modified document 314 contains unprotected entities in lieu of the protected entities. The unprotected entities match the features of the protected entities but vary in substance. For example, in the name field of both the original document 312 and the modified document 314, a name is listed. In modified document 314, however, the name is different, so as to protect an individual's real name provided in the original document 312. As stated above, the generated name may also share qualities with the original name such as a font type, size, color, etc., as well as where in the document it appears (i.e., in the name field). The address and social security number are likewise altered to prevent exposing sensitive data. Other fields, such as income and marital status, are left unchanged to allow for processing (such as financial analysis) and alone do not constitute protected information. By automatically replacing protected entities with unprotected entities that correspond to particular characteristics of the protected entities, aspects of the presented disclosure enable the modified document to be processed by a software component that is configured to process documents with entities having those particular characteristics, thereby ensuring compatibility of the modified documents with such a software component while ensuring data privacy.

Figure 4:
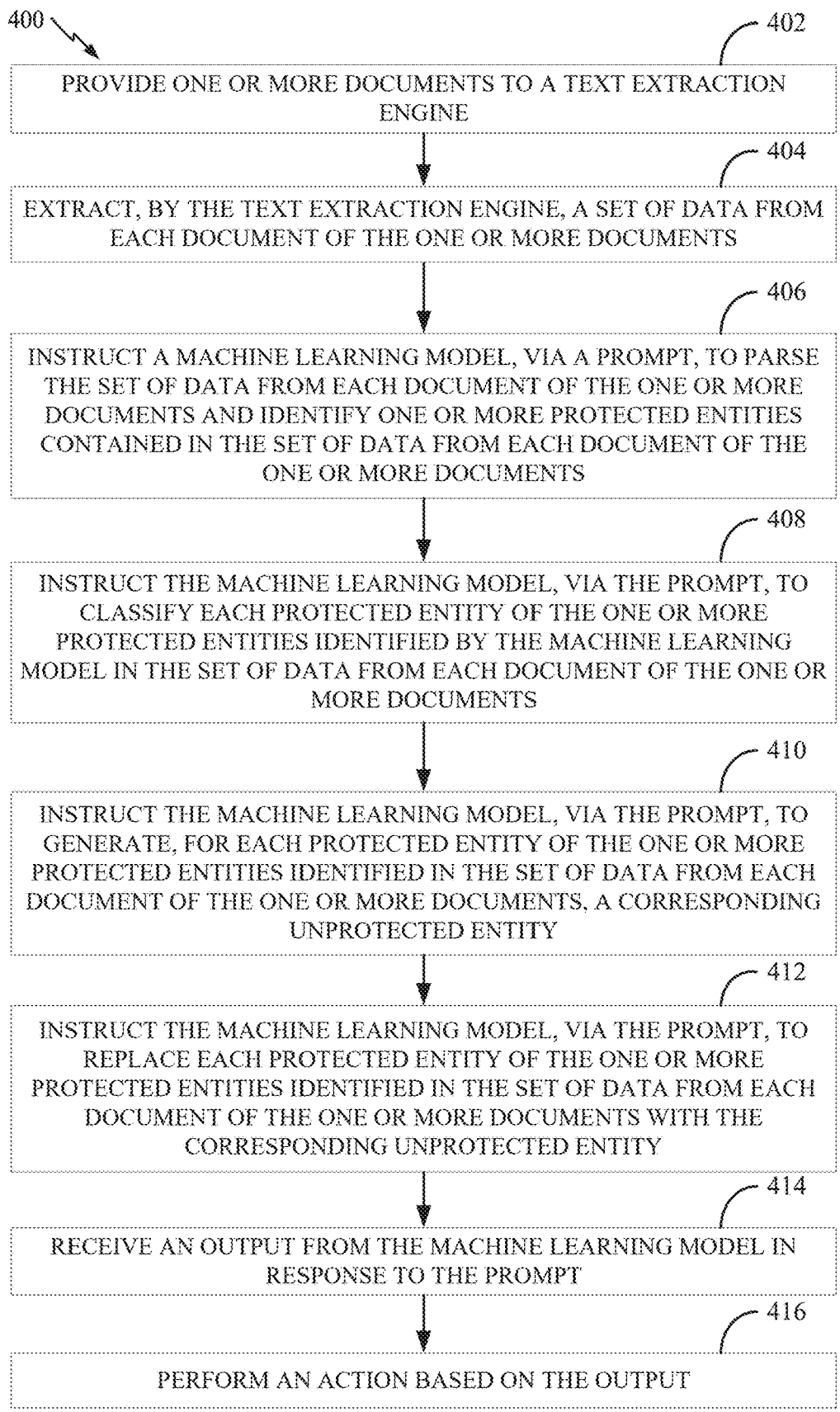
FIG. 4 depicts example operations related to automated data extraction and prediction using machine learning models.

Example Operations Related to Automated Data Extraction and Prediction Using Machine Learning Models FIG. 4 depicts example operations 400 related to automated data extraction and prediction using machine learning models. For example, operations 400 may be performed by one or more of the components described with respect to FIG. 1, FIG. 2, and/or FIG. 3.

Operations 400 begin at step 402 with providing one or more documents to a text extraction engine. In some embodiments, the providing the one or more documents to the text extraction engine further comprises, for any particular document of the one or more documents that exceeds one page in length, dividing the particular document into subsets comprising smaller documents not exceeding one page in length and providing the subsets, instead of the particular document, to the text extraction engine. According to certain embodiments, the one or more documents comprise one or more of: one or more documents in a document file format; or one or more documents in an image file format.

Operations 400 continue at step 404 with extracting, by the text extraction engine, a set of data from each document of the one or more documents. Some embodiments provide that the set of data from each document of the one or more documents comprises one or more of: one or more lines of text; a format of the one or more lines of text; or a geometry associated with the one or more lines of text.

Operations 400 continue at step 406 with instructing a machine learning model, via a prompt, to parse the set of data from each document of the one or more documents and identify one or more protected entities contained in the set of data from each document of the one or more documents. In certain embodiments, the instructing the machine learning model, via the prompt, to parse the set of data from each document of the one or more documents and identify the one or more protected entities contained in the set of data from each document of the one or more documents further comprises removing, from the set of data from each document of the one or more documents, any entity not identified as the one or more protected entities.

Operations 400 continue at step 408 with instructing the machine learning model, via the prompt, to classify each protected entity of the one or more protected entities identified by the machine learning model in the set of data from each document of the one or more documents.

Operations 400 continue at step 410 with instructing the machine learning model, via the prompt, to generate, for each protected entity of the one or more protected entities identified in the set of data from each document of the one or more documents, a corresponding unprotected entity. According to some embodiments, the instructing the machine learning model, via the prompt, to generate, for each protected entity of the one or more protected entities identified in the set of data from each document of the one or more documents, the corresponding unprotected entity comprises determining one or more attributes associated with the protected entity and assigning the one or more attributes to the corresponding unprotected entity. Certain embodiments provide that the one or more attributes comprise one or more of: a font type; a font size; a background color; or a location within a page.

Operations 400 continue at step 412 with instructing the machine learning model, via the prompt, to replace each protected entity of the one or more protected entities identified in the set of data from each document of the one or more documents with the corresponding unprotected entity.

Operations 400 continue at step 414 with receiving an output from the machine learning model in response to the prompt.

Operations 400 continue at step 416 with performing an action based on the output. In some embodiments, the performing of the action based on the output comprises one or more of: providing the one or more protected entities identified in the set of data from each document of the one or more documents and a classification for each protected entity of the one or more protected entities identified in the set of data from each document of the one or more documents in a structured object format; saving each document of the one or more documents; displaying the output via a user interface; or sending the output to one or more elements of a software application.

Figure 5:
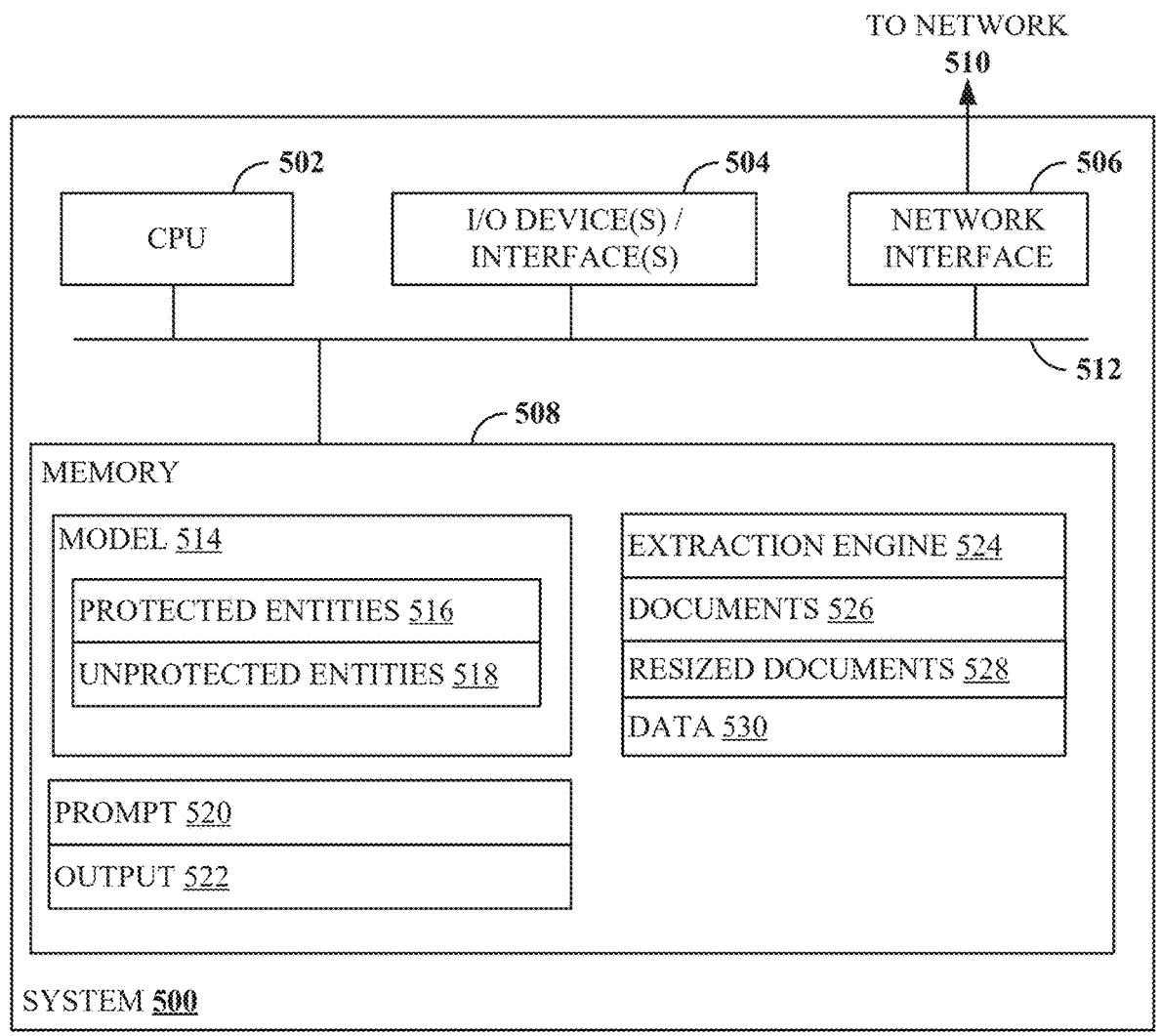
FIG. 5 depicts an example of a processing system for automated data extraction and prediction using machine learning models.

Example of a Processing System for Automated Data Extraction and Prediction Using Machine Learning Models FIG. 5 illustrates an example system 500 with which embodiments of the present disclosure may be implemented. For example, system 500 may be configured to perform operations 400 of FIG. 4 and/or to implement one or more components as in FIG. 1, FIG. 2, or FIG. 3.

System 500 includes a central processing unit (CPU) 502, one or more I/O device interfaces that may allow for the connection of various I/O devices 504 (e.g., keyboards, displays, mouse devices, pen input, etc.) to the system 500, network interface 506, a memory 508, and an interconnect 512. It is contemplated that one or more components of system 500 may be located remotely and accessed via a network 510. It is further contemplated that one or more components of system 500 may comprise physical components or virtualized components.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, and memory 508. CPU 502 is included to be representative of a single CPU, multiple CPUs, a single CPU having multiple processing cores, and other arrangements.

Additionally, the memory 508 is included to be representative of a random access memory or the like. In some embodiments, memory 508 may comprise a disk drive, solid state drive, or a collection of storage devices distributed across multiple storage systems. Although shown as a single unit, the memory 508 may be a combination of fixed and/or removable storage devices, such as fixed disc drives, removable memory cards or optical storage, network attached storage (NAS), or a storage area-network (SAN).

As shown, memory 508 includes model 514, protected entities 516, unprotected entities 518, prompt 520, and output 522. Model 514 may be representative of model 210 of FIG. 2. Protected entities 516 may be representative of protected entities 222 of FIG. 2. Unprotected entities 518 may be representative of unprotected entities 242 of FIG. 2. Prompt 520 may be representative of prompt 202 of FIG. 2. Output 522 may be representative of output 252 of FIG. 2.

Memory 508 further comprises extraction engine 524 which may correspond to extraction engine 120 of FIG. 1. Memory 508 further comprises documents 526, which may correspond to documents 102 of FIG. 1. Memory 508 further comprises resized documents 528, which may correspond to resized documents 112 of FIG. 1. Memory 508 further comprises data 530, which may correspond to data 122 of FIG. 1 and FIG. 2. It is noted that in some embodiments, system 500 may interact with one or more external components, such as via network 510, in order to retrieve data and/or perform operations. Furthermore, techniques described herein may be implemented via more or fewer components than those shown and described with respect to FIG. 5, such as on one or more computing systems.

ADDITIONAL CONSIDERATIONS

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a c c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for automated data extraction and prediction using machine learning models, comprising:
    providing one or more documents to a text extraction engine;
    extracting, by the text extraction engine, a set of data from each document of the one or more documents;
    instructing a machine learning model, via a prompt, to parse the set of data from each document of the one or more documents and identify one or more protected entities contained in the set of data from each document of the one or more documents;
    instructing the machine learning model, via the prompt, to classify each protected entity of the one or more protected entities identified by the machine learning model in the set of data from each document of the one or more documents;
    instructing the machine learning model, via the prompt, to generate, for each protected entity of the one or more protected entities identified in the set of data from each document of the one or more documents, a corresponding unprotected entity;
    instructing the machine learning model, via the prompt, to replace each protected entity of the one or more protected entities identified in the set of data from each document of the one or more documents with the corresponding unprotected entity;
    receiving an output from the machine learning model in response to the prompt; and
    performing an action based on the output.

2. The method of claim 1, wherein the providing the one or more documents to the text extraction engine further comprises, for any particular document of the one or more documents that exceeds one page in length, dividing the particular document into subsets comprising smaller documents not exceeding one page in length and providing the subsets, instead of the particular document, to the text extraction engine.

3. The method of claim 2, wherein the receiving the output from the machine learning model in response to the prompt is based on combining the subsets comprising smaller documents not exceeding one page in length into a single document having an original length exceeding one page in length.

4. The method of claim 1, wherein the one or more documents comprise one or more of:
    one or more documents in a document file format; or
    one or more documents in an image file format.

5. The method of claim 1, wherein the set of data from each document of the one or more documents comprises one or more of:
    one or more lines of text;
    a format of the one or more lines of text; or
    a geometry associated with the one or more lines of text.

6. The method of claim 1, wherein the instructing the machine learning model, via the prompt, to parse the set of data from each document of the one or more documents and identify the one or more protected entities contained in the set of data from each document of the one or more documents further comprises removing, from the set of data from each document of the one or more documents, any entity not identified as the one or more protected entities.

7. The method of claim 1, wherein the instructing the machine learning model, via the prompt, to generate, for each protected entity of the one or more protected entities identified in the set of data from each document of the one or more documents, the corresponding unprotected entity comprises determining one or more attributes associated with the protected entity and assigning the one or more attributes to the corresponding unprotected entity.

8. The method of claim 7, wherein the one or more attributes comprise one or more of:
    a font type;
    a font size;
    a background color; or
    a location within a page.

9. The method of claim 1, wherein the performing of the action based on the output comprises one or more of:
    providing the one or more protected entities identified in the set of data from each document of the one or more documents and a classification for each protected entity of the one or more protected entities identified in the set of data from each document of the one or more documents in a structured object format;
    saving each document of the one or more documents;
    displaying the output via a user interface; or
    sending the output to one or more elements of a software application.

10. A system for automated data extraction and prediction using machine learning models, comprising:
    one or more processors; and
    a memory comprising instructions that, when executed by the one or more processors, cause the system to:
        provide one or more documents to a text extraction engine;
        extract, by the text extraction engine, a set of data from each document of the one or more documents;
        instruct a machine learning model, via a prompt, to parse the set of data from each document of the one or more documents and identify one or more protected entities contained in the set of data from each document of the one or more documents;
        instruct the machine learning model, via the prompt, to classify each protected entity of the one or more protected entities identified by the machine learning model in the set of data from each document of the one or more documents;

instruct the machine learning model, via the prompt, to generate, for each protected entity of the one or more protected entities identified in the set of data from each document of the one or more documents, a corresponding unprotected entity;

instruct the machine learning model, via the prompt, to replace each protected entity of the one or more protected entities identified in the set of data from each document of the one or more documents with the corresponding unprotected entity;

receive an output from the machine learning model in response to the prompt; and perform an action based on the output.

11. The system of claim 10, wherein the providing the one or more documents to the text extraction engine further comprises, for any particular document of the one or more documents that exceeds one page in length, dividing the particular document into subsets comprising smaller documents not exceeding one page in length and providing the subsets, instead of the particular document, to the text extraction engine.

12. The system of claim 11, wherein the receiving the output from the machine learning model in response to the prompt is based on combining the subsets comprising smaller documents not exceeding one page in length into a single document having an original length exceeding one page in length.

13. The system of claim 10, wherein the one or more documents comprise one or more of:
   one or more documents in a document file format; or
   one or more documents in an image file format.

14. The system of claim 10, wherein the set of data from each document of the one or more documents comprises one or more of:
   one or more lines of text;
   a format of the one or more lines of text; or
   a geometry associated with the one or more lines of text.

15. The system of claim 10, wherein the instructing the machine learning model, via the prompt, to parse the set of data from each document of the one or more documents and identify the one or more protected entities contained in the set of data from each document of the one or more documents further comprises removing, from the set of data from each document of the one or more documents, any entity not identified as the one or more protected entities.

16. The system of claim 10, wherein the instructing the machine learning model, via the prompt, to generate, for each protected entity of the one or more protected entities identified in the set of data from each document of the one or more documents, the corresponding unprotected entity comprises determining one or more attributes associated with the protected entity and assigning the one or more attributes to the corresponding unprotected entity.

17. The system of claim 16, wherein the one or more attributes comprise one or more of:
   a font type;
   a font size;
   a background color; or
   a location within a page.

18. The system of claim 10, wherein the performing of the action based on the output comprises one or more of:
   providing the one or more protected entities identified in the set of data from each document of the one or more documents and a classification for each protected entity of the one or more protected entities identified in the set of data from each document of the one or more documents in a structured object format;
   saving each document of the one or more documents;
   displaying the output via a user interface; or
   sending the output to one or more elements of a software application.

19. A non-transitory computer readable medium comprising instructions that, when executed by one or more processors of a computing system, cause the computing system to:
   provide one or more documents to a text extraction engine;
   extract, by the text extraction engine, a set of data from each document of the one or more documents;
   instruct a machine learning model, via a prompt, to parse the set of data from each document of the one or more documents and identify one or more protected entities contained in the set of data from each document of the one or more documents;
   instruct the machine learning model, via the prompt, to classify each protected entity of the one or more protected entities identified by the machine learning model in the set of data from each document of the one or more documents;
   instruct the machine learning model, via the prompt, to generate, for each protected entity of the one or more protected entities identified in the set of data from each document of the one or more documents, a corresponding unprotected entity;
   instruct the machine learning model, via the prompt, to replace each protected entity of the one or more protected entities identified in the set of data from each document of the one or more documents with the corresponding unprotected entity;
   receive an output from the machine learning model in response to the prompt; and
   perform an action based on the output.

20. The non-transitory computer readable medium of claim 19, wherein the providing the one or more documents to the text extraction engine further comprises, for any particular document of the one or more documents that exceeds one page in length, dividing the particular document into subsets comprising smaller documents not exceeding one page in length and providing the subsets, instead of the particular document, to the text extraction engine.

* * * * *